Figure 1:
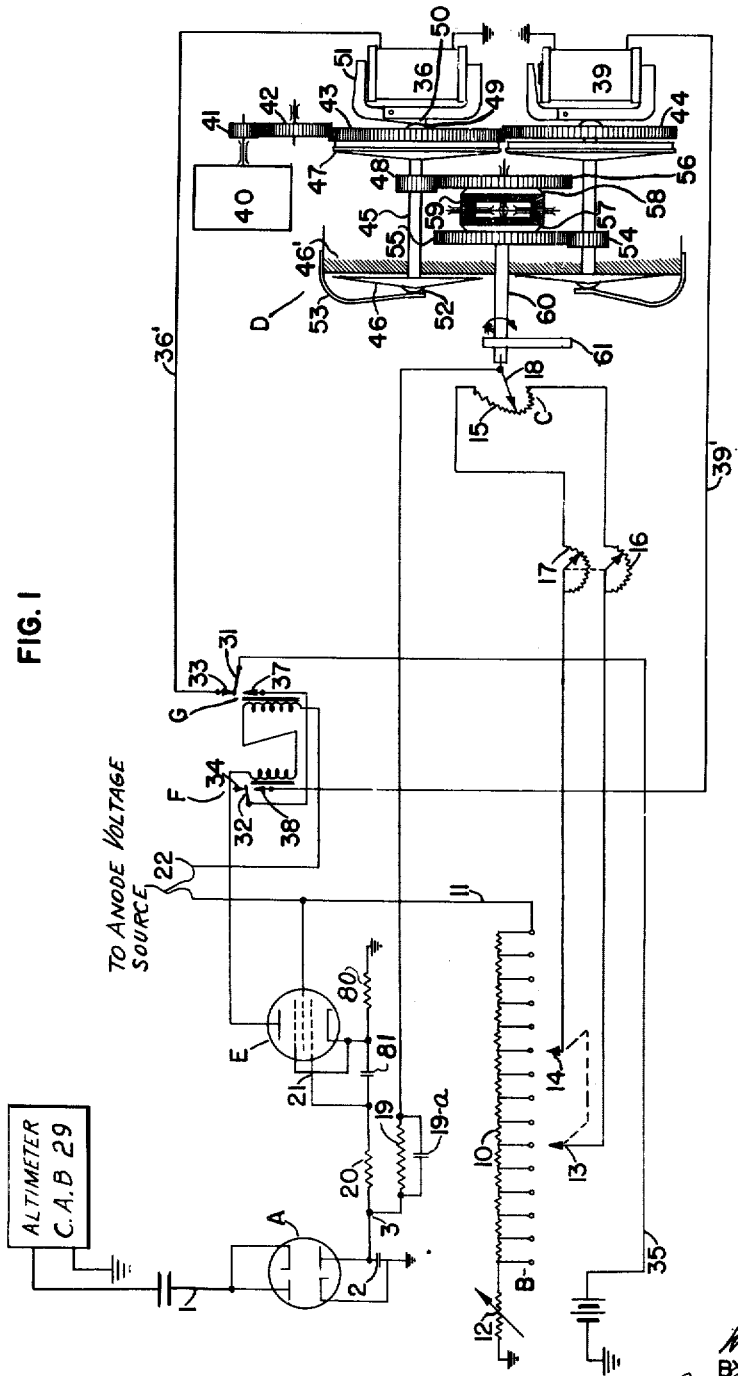

Dec. 16, 1947.   W. C. COULBOURN   2,432,862
ALTITUDE CONTROL FOR AIRCRAFT
Filed Sept. 19, 1944   2 Sheets-Sheet 1

INVENTOR
William C. Coulbourn
BY
Sawyer & Kennedy
ATTORNEYS

Dec. 16, 1947. W. C. COULBOURN 2,432,862
ALTITUDE CONTROL FOR AIRCRAFT
Filed Sept. 19, 1944 2 Sheets-Sheet 2

INVENTOR
William C. Coulbourn
BY
Sawyer & Kennedy
ATTORNEYS

Patented Dec. 16, 1947

2,432,862

UNITED STATES PATENT OFFICE 2,432,862

ALTITUDE CONTROL FOR AIRCRAFT

William C. Coulbourn, Port Washington, N. Y., assignor to The Norden Laboratories Corporation, New York, N. Y., a corporation of New York Application September 19, 1944, Serial No. 554,839

20 Claims. (Cl. 172—282)

The invention herein described may be manufactured by or for, may be used, and material embodying the invention may be sold, or otherwise disposed of in accordance with law by or for, the Government of the United States of America for governmental purposes, without the payment of any royalties thereon or thereunder.

This invention relates to flight control for aircraft and more particularly to altitude control therefor.

The general object of this invention is to provide an improved form of automatic altitude control for aircraft.

A second object of the invention is to provide automatic altitude control for aircraft in which the aircraft attitude is adjusted, in response to variation from set altitude, around the attitude for level flight smoothly and without overrun.

A further object of the invention is to provide an altitude control which avoids incessant operation of the control system and too rigid a flight.

Another object of the invention is to provide anticipating means in an aircraft flight control, by means of which the effect of lag in the control system response may be reduced or eliminated.

Another object of the invention is to provide an altitude control system in conjunction with existing altimeter and automatic pilot mechanisms and such that it may serve as a tie-in between the same without requiring undue modification of either the altimeter or the automatic pilot.

Still another object of the invention is to provide automatic control means for fast acting servomotors which provide for smooth and substantially dead beat adjustment without sacrificing speed of adjustment or sensitivity.

With these and other objects which will appear in the following full description in mind, the invention consists in the combinations and arrangements of parts and details of construction which will now first be fully described in connection with the accompanying drawing and then pointed out more particularly in the appended claims.

Figure 2:
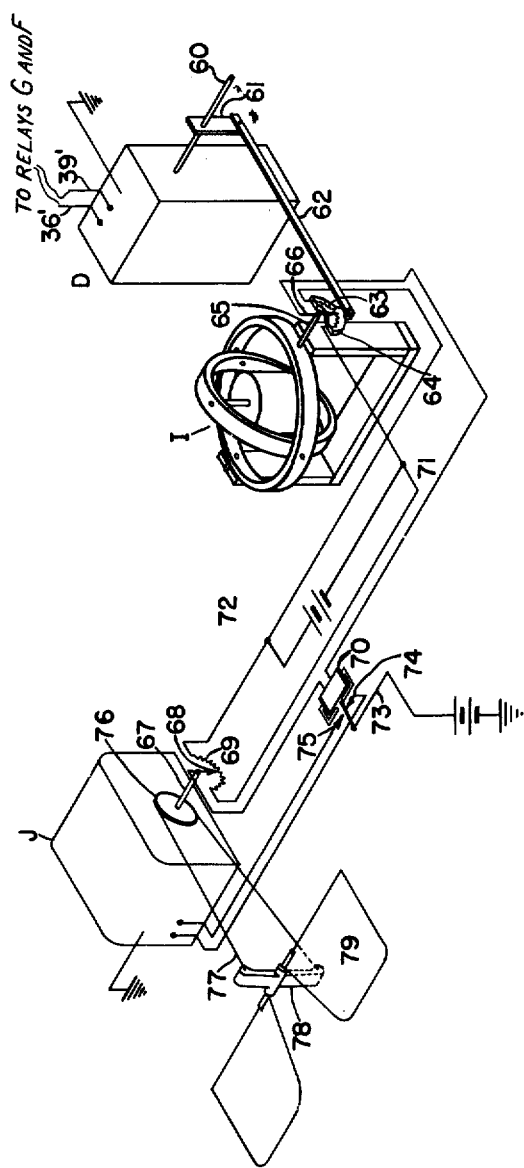

In the drawing:

Figure 1 is a wiring diagram showing an automatic altitude control embodying the invention in a preferred form, and showing also so much of an altimeter and automatic pilot associated therewith as is necessary for a full understanding of the invention; and Figure 2 is a perspective and schematic view of an aircraft automatic pilot elevator control system, illustrating the action produced by the altitude control of the invention.

The device of the invention operates through the automatic pilot illustrated in Figure 2 to maintain altitude at a set value, controlling the automatic pilot in response to a pre-set signal representing the set altitude and also in response to an altimeter indication.

While the system of the invention may be employed with altimeters of various types, including those in which barometric height is measured and those in which height above sea level or ground level is measured in various ways, the system is shown for definiteness as applied to an altimeter of the general type described in Civil Aeronautics Bulletin No. 29, at pages 86 to 90, and in which a frequency modulated radio beam is transmitted from the aircraft to the ground or sea and the altitude is measured by measuring the phase difference between transmitted and reflected waves, this difference being exhibited in the form of an audio frequency voltage, the frequency of which varies with the altitude, and which is in turn translated into a D. C. output vo'tage representing altitude.

The general operation of the circuit shown in Figure 1 is as follows: The D. C. voltage developed by the twin diode A in response to energy received from the altimeter represents the altitude, and is opposed to a voltage which represents the set altitude, taken off the controller B through the brush of a potentiometer C mounted on the shaft of attitude servomotor D. The resultant voltage is amplified by the amplifier E and serves to control the high and low relays F and G, which in turn operate the clutch control magnets of the attitude servomotor D, thus controlling the rotation of the servomotor shaft and of the brush of the potentiometer C mounted on the servomotor shaft. When the voltage developed by the double diode A is in proper balance with the voltage taken off controller B through potentiometer C, or sufficiently near to balance so as to energize the relay G but not the relay F, the shaft of servomotor D will remain stationary and no change of elevator setting will be produced. When, however, the altimeter voltage and controller voltage are out of balance, the operation of relays F and G will actuate servomotor D, thus controlling the aircraft attitude through the automatic pilot mechanism of Figure 2 and also balancing the altimeter and controller voltage by moving the brush of potentiometer C.

As will be understood by those skilled in the art, the altimeter produces an audio frequency voltage of substantially uniform amplitude, but the frequency of which varies with the altitude, and which is applied across the point 1 and the ground connection. This audio frequency voltage is supplied to the double diode A through a capacitor and is converted by the double diode A into a rectified voltage which appears across condenser 2 so that the point 3 is negative with respect to ground and the magnitude of its voltage corresponds to the frequency and hence to the altitude. The relation between this voltage and the altitude may be linear or non-linear, operation with a non-linear characteristic requiring merely suitable calibration of the controller B.

The controller B comprises a resistor 10, to which is applied from line 11 a D. C. voltage obtained from the anode voltage supply of the amplifier E. The voltage appearing across the controller B may be adjusted by the trimmer resistor 12. The voltage of line 11 will be maintained constant by suitable voltage regulating devices, not shown. Resistor 10 is tapped at a plurality of points as indicated, and the set altitude voltage is taken off this resistor by contacts 13 and 14, moving together and which are so set as to span a fixed number of taps of the resistor 10. The voltage between the brushes 13 and 14 is applied across the resistor sector 15 of potentiometer C through the variable resistors 16 and 17. These resistors 16 and 17 are ganged together on a common adjusting shaft for a purpose which is later described in detail.

If it be assumed that the potentiometer brush 18 is in centered position, this brush will accordingly be at a voltage equal to a voltage half way between that of brush 13 and that of brush 14 relative to ground, and this voltage represents the set altitude. Movement of the brush 18 in either direction will correspondingly increase or decrease the voltage at the brush 18. Brush 18 is connected through resistor 19 to the point 3 which is at a voltage, positive with respect to ground, and varying with adjustment of brushes 13 and 14 and movement of brush 18. This voltage is combined with the altimeter voltage developed by the double diode A which appears across condenser 2 and the resultant voltage is applied through resistor 20 to the control grid 21 of the amplifier E. The amplifier tube E may be of any suitable type such as a pentode, as shown, in which case the suppressor grid is connected in customary manner to the cathode. The cathode is connected through a self-bias resistor 80 to ground, and a by-pass condenser 81 is connected between the cathode and the grid. The plate circuit of this tube extends from the line 22 through the windings of the relays F and G in series, as shown. The armatures of relays F and G are spring biased toward the upper position, or the position of Figure 1 so that armature 31 of relay G makes contact with the contact 33 and armature 32 of relay F makes contact with the dead contact 34, when the plate current is insufficient to operate either of the relay armatures 31 and 32. Relay G is set to operate on a lower value of plate current than relay F and accordingly the operation of the relays is as follows: If the plate current of the amplifier tube E is below a set value neither relay winding will be effectively energized and both armatures will be in the upper position as shown in Figure 1. Under these conditions current will pass to ground from the low voltage line 35 through armature 31, contact 33 and line 36', and the winding of clutch magnet 36 of the servomotor D. This represents a condition in which the altimeter indicated altitude exceeds the set altitude and will cause the servomotor, as later described, to adjust the automatic pilot for downward flight. When the plate current increases to a certain value, relay G will be energized, bringing the armature 31 into contact with contact 37. Inasmuch, however, as this contact is connected, as shown, to the armature 32 which is still against the dead contact 34, neither of the servo clutch magnets will be energized and no change of elevator setting will be made. This condition continues as the plate current increases through an inactive zone determined by the operating current differential between relays F and G, until the plate current reaches a value sufficient to energize relay F. Thereupon armature 32 is brought into contact with contact 38 and a circuit is established from line 35 through armature 31, contact 37, armature 32 and contact 38, and line 39', through clutch magnet 39 of the servomotor D and producing, as later described, adjustment of the aircraft elevator for upward flight.

The preferred form of servo motor for use in the altitude control of the invention is illustrated schematically in Figure 1. As there shown, the constantly running motor 40, through pinion 41 and idle gear wheel 42, drives the free gear 43 and the free gear 44 in mesh therewith. Free gear 43 is rotatably carried on a shaft 45, fixed to which are the brake disk 46, clutch disk 47 and pinion 48. The gear 43 is provided with a boss 49 for engagement by the end 50 of the armature or clapper 51 of the clutch magnet 36. The brake disk 46 is likewise provided with a boss 52 through which the shaft 45 is urged toward braking position by the spring 53. Accordingly, when the clutch magnet 36 is not energized, spring 53 will force shaft 45 to the right in the figure, so that brake disk 46 engages the surface 46' thus holding shaft 45 and pinion 48 against rotation. The armature 51 will be in the position indicated in connection with clutch magnet 39, so that gear 43 is idle. When, however, clutch magnet 36 is energized, the armature 51 engages the boss 49 to force the shaft 45 to the left against spring 53, thus disengaging the brake disk 46 and engaging the gear 43 in driving relation with the clutch member 47. The mechanism associated with the gear 44 and its pinion 54 is identical with that described in connection with gear 43 and hence requires no further description. Pinions 48 and 54, respectively, engage the free gear wheels 55 and 56 of a gear differential, and these wheels respectively carry the bevel gears 57 and 58 which engage the spider 59, which serves to turn the shaft 60 of the servo motor.

The action of the mechanism is as follows: When neither of the clutch magnets 36 or 39 is energized, both of the servo brake disks will be engaged and the pinions 48 and 54 will accordingly both be held against rotation. The differential is accordingly locked and the shaft 60 is held stationary. If now the magnet 36 is energized, the brake disk 46 is freed, the gear 43 is forced into driving connection with the clutch member 47 and thus through pinion 48 drives the free wheel 56 of the differential. Gear 44, however, rotates idly and pinion 54 and hence wheel 56 of the differential are held by the brake. Accordingly, rotation of the shaft 60 is produced. When the clutch magnet 39 is energized, a similar action occurs, but a rotation of shaft 60 in the opposite direction is produced.

The action of the servomotor D upon the aircraft elevator is exhibited in Figure 2. As there shown, the servo shaft 60 is connected through arm 61, link 62 and arm 63 to the resistor sector 64 of the vertical gyro potentiometer. This resistor sector 64 is mounted rotatably about the shaft 65 of vertical gyro I, by means not shown, and its brush 66 is fixed upon the shaft 65. The gyro potentiometer serves to control the elevator servomotor J through a follow-up system in the form of a bridge circuit. The driven shaft 67 of the elevator servomotor J carries a potentiometer brush 68, sliding over a resistor sector 69. Brushes 68 and 66 are connected to the winding 70 of a polarized relay and electric power is applied through leads 71 and 72 across the resistor sectors 64 and 69, thus forming a bridge circuit so that any difference in angular position of brushes 66 and 68 with respect to their respective resistors sectors will cause current to flow through winding 70 of the polarized relay, the direction of the current depending on the direction of unbalance. When winding 70 is energized the armature 73 thereof will make contact with either the contact 74 or the contact 75, thus actuating the elevator servomotor J so as to produce rotation of its shaft 67 in one direction or the other depending upon the direction in which contact is made. The servomotor J may be identical in action with the servomotor D and hence no further description of its action is necessary. This servomotor J, through pulley 76, cable 77 and arms 78 serves to control the aircraft elevator 79.

Rotation of shaft 60 of servomotor D through a given angle will, by rotation of resistor sector 64, unbalance the bridge circuit, thus energizing the winding 70 of the polarized relay and causing shaft 67 of servomotor J to rotate until its potentiometer brush 68 balances the circuit thus causing corresponding angular adjustment of the elevator 79. As this adjustment takes effect, the resulting change of attitude of the aircraft will produce rotation of the gyro supporting structure and other parts relative to the shaft 65, and thus will produce rotation of the arm 63 relative to the sector 64. The result of this movement is to cause the gyro potentiometer to move back toward the original balance position, this movement being followed by the servomotor J through the bridge circuit until a point of balance is reached, representing a determined aircraft attitude corresponding to any given position of the shaft of servomotor D, for given conditions of load, airspeed and trim.

In the manner described any sufficient unbalance in either direction between the altimeter voltage and the controller voltage communicated to the grid 21 of the amplifier E will cause adjustment of aircraft elevator setting and of aircraft attitude. If it be assumed that the aircraft is in level flight, potentiometer brush 18 attached to the shaft of servomotor D is centered and relay G is energized and relay F is not, and that, for any reason, the aircraft rises sufficiently to deenergize relay G, a circuit will be established through relay winding 36 of the servomotor D causing rotation of the shaft 6C in the direction of the arrow. The corresponding rotation of brush 18 increases the voltage between ground and this brush, and hence increases the positive controller voltage at point 3. The servomotor D will continue to operate so as to increase attitude adjustment for downward flight until its shaft 60 has rotated sufficiently so as to increase the positive voltage applied at point 3 by the controller to a point where the resultant voltage on the grid 21 is again within the neutral range. At this point relay G is again energized and the servomotor D becomes inactive. Inasmuch as the voltage developed by the altimeter can be considered within reasonable limits of variation as proportional to the altitude, the effect of this adjustment will be to produce a change in aircraft attitude in proportion to the difference between the set altitude and the actual altitude. Assuming fixed conditions of load, trim and airspeed, the resulting change in aircraft vertical velocity will also tend to be proportional to the deviation from the set altitude. The action produced by voltage unbalance in the opposite direction is similar, it being understood, however, that the direction of adjustment is reversed.

The rotation of shaft 60 of servomotor D and also the adjustment made in aircraft attitude and aircraft vertical velocity accordingly depend upon the voltage variation produced by rotation of the potentiometer shaft through a given angle. For example, too great a rate of change of voltage will result in the movement of the shaft 60 being confined within such narrow limits as to nullify the control while, on the other hand, too slow a change of voltage with rotation of this shaft will result in too rapid a change in aircraft elevator setting and a change through excessive angles. It is therefore desirable to control the relationship between angle of turn of the shaft 60 and the change in voltage at the brush 18. This result may be accomplished by means of the resistors 16 and 17 previously referred to. Turning the control knob for these resistors so as to short the same will impress the entire voltage between brushes 13 and 14 across resistor sector 15, resulting in maximum change of voltage per degree of rotation of the shaft 16 and minimum aircraft attitude adjustment in response to change of altitude. Turning the control knob so as to throw the entire resistance into series with the sector 15 will reduce the voltage change per degree rotation of the shaft 60 and will accordingly increase the change in attitude. By setting resistors 16 and 17 at any desired intermediate point, the ratio between change of attitude and change of altitude from the set value may be varied to suit conditions as desired.

Inasmuch as there is a certain amount of lag involved in the operation of relays F and G and the servomotor D is extremely fast, the system as thus far described will have a tendency to overrun in making an adjustment, so that brush 18 will move beyond the balance position and then move back, creating an oscillatory condition. To eliminate this action the condenser 19a, which serves as an anticipating element, is connected across the resistor 19. When shaft 60 of the servomotor D and the brush 18 attached thereto are in motion, the voltage at the brush 18 will vary so that current will flow through condenser 19a thus producing a voltage variation at point 3 in the same direction as the adjustment. Accordingly, a condition of balance at point 3 will be indicated slightly in advance of the time when the brush 18 reaches the actual balance point, so that the additional movement caused by the lag of the system will tend to bring the brush to the balance point rather than to cause overrun. By varying the capacity of condenser 19a and the amount of resistance across which it is shunted, or the voltage on the potentiometer C, the anticipating effect may be suitably related to the automatic pilot system so as very largely to reduce or to eliminate tendency toward overshooting.

By regulating the operating current differential between relays F and G, an inactive zone of any desired width may be created. Normally an inactive zone representing a difference of a few feet above or below the set altitude is desirable for the purpose of preventing constant adjustment in respect to minor random factors and also with a view to preventing undue strain on the aircraft. The servomotor D likewise has a neutral or stationary position so that constant operation of the servomotor in one direction or the other is avoided. In consequence, a very smooth and stable flight may be obtained, with the relays F and G and servomotor D operating only occasionally and as necessary. These results cannot be obtained with a servomotor of the type which is constantly activated in one direction or the other nor with a relay system having no dead point or inactive zone. For these reasons, in the preferred embodiment of the invention a servomotor and relay system, both of which have a dead or neutral position, are utilized.

As will be understood, suitable switch elements will be provided for cutting out the automatic altitude control where manual operation is desired. Such elements, however, are eliminated from the present drawing and specification for simplicity, since they form no part of the present invention.

What is claimed is:

1. In an altitude control system for aircraft having an altimeter for producing a signal voltage for indicating deviation from set altitude and automatic pilot means for regulating aircraft attitude, and in combination, an attitude servomotor, altimeter responsive control means for operating said servomotor to adjust aircraft attitude in accordance with altitude deviation, said control means including a source of voltage for obtaining a control voltage corresponding to a predetermined altitude, a follow-up system between said servomotor and said control means for balancing the altimeter signal voltage against said control voltage when the servomotor has moved to the required extent, and manually operable follow-up regulating means for varying the extent of movement of said servomotor which is required to balance a given altimeter signal voltage.

2. In an altitude control system for aircraft having an altimeter for producing a signal voltage indicating deviation from set altitude and automatic pilot means for regulating aircraft attitude, and in combination, an attitude servomotor, control means responsive to an altimeter for operating said servomotor to adjust aircraft attitude in accordance with altitude deviation, said control means including a source of voltage for obtaining a control voltage corresponding to a predetermined altitude, a follow-up system between said servomotor and said control means for balancing the altimeter signal voltage against said control voltage when the servomotor has moved to the required extent, and anticipation means for superposing on the follow-up system a transient signal indicating servomotor movement in excess of actual movement and in accordance with rate of movement of said servomotor.

3. In an altitude control system for aircraft having an altimeter for indicating deviation from set altitude and automatic pilot means for regulating aircraft attitude, and in combination, an electrically controlled attitude servomotor, voltage controlled relay means responsive to an altimeter for operating said servomotor to adjust aircraft attitude in accordance with altitude deviation, a follow-up system between said servomotor and said control means comprising servomotor potentiometer means for deriving a variable voltage corresponding to the extent of servomotor movement and applying the said voltage to said relay means, and variable resistance means for regulating the voltage across said potentiometer, whereby the extent of movement of said servomotor which corresponds to a given altitude deviation may be regulated.

4. In an altitude control system for aircraft having an altimeter for producing a signal voltage indicating altitude and automatic pilot means for regulating aircraft attitude and in combination, an attitude servomotor having a neutral position, control means including a source of voltage for obtaining a control voltage corresponding to a predetermined set altitude, said control means being arranged to operate said servomotor to adjust aircraft attitude in accordance with altitude deviation, said control means also having a neutral position, a follow-up system interconnecting said servomotor and said control means for balancing said control voltage against said altimeter signal voltage when the servomotor has been moved the required amount whereby a zone of altitude deviation is established wherein the altitude control system is ineffective, and anticipation means operated by said servomotor for superimposing upon said follow-up system a transient signal indicating servomotor movement in excess of actual movement and in accordance with the rate of movement of said servomotor.

5. In an altitude control system for aircraft having an altimeter for producing a signal voltage indicating altitude and automatic pilot means for regulating aircraft attitude and in combination, an attitude servomotor having a neutral position, control means including a source of voltage for obtaining a control voltage corresponding to a predetermined set altitude, said control means being arranged to operate said servomotor to adjust aircraft attitude in accordance with altitude deviation, said control means also having a neutral position, a follow-up system interconnecting said servomotor and said control means for balancing said control voltage against said altimeter signal voltage when the servomotor has been moved the required amount, and regulating means for said follow-up system for varying the extent of servomotor movement required to balance a given altimeter signal voltage.

6. In an altitude control system for aircraft having an altimeter for producing a signal voltage indicating altitude and automatic pilot means for regulating aircraft attitude and in combination, an attitude servomotor having a neutral position, control means including a source of voltage for obtaining a control voltage corresponding to a predetermined set altitude, said control means being arranged to operate said servomotor to adjust aircraft attitude in accordance with altitude deviation, said control means also having a neutral position, a follow-up system interconnecting said servomotor and said control means for balancing said control voltage against said altimeter signal voltage when the servomotor has been moved the required amount, anticipation means operated by said servomotor for superposing on said follow-up system a transient signal indicating servomotor movement in excess of actual movement and in accordance with the rate of movement of said servomotor, and regulating means for said follow-up system for varying the extent of servomotor movement required to balance a given altimeter signal voltage.

7. In an altitude control system for aircraft having an altimeter for indicating deviation from set altitude and automatic pilot means for regulating aircraft attitude, and in combination, an electrically controlled attitude servomotor, voltage controlled relay means responsive to an altimeter for operating said servomotor to adjust aircraft attitude in accordance with altitude deviation, a follow-up system between said servomotor and said control means comprising servomotor potentiometer means for deriving a variable voltage corresponding to the extent of servomotor movement and applying the said voltage to said relay means, and a resistor and by-pass condenser connecting said potentiometer means to said relay means, whereby a transient anticipation voltage is applied to said relay means for preventing oscillation of said control system.

8. In an altitude control system for aircraft having an altimeter for indicating deviation from set altitude and automatic pilot means for regulating aircraft attitude, and in combination, an electrically controlled attitude servomotor, voltage controlled relay means responsive to an altimeter for operating said servomotor to adjust aircraft attitude in accordance with altitude deviation, a follow-up system between said servomotor and said control means comprising servomotor potentiometer means for deriving a variable voltage corresponding to the extent of servomotor movement and applying the said voltage to said relay means, variable resistance means for regulating the voltage across said potentiometer, whereby the extent of movement of said servomotor which corresponds to a given altitude deviation may be regulated, and a resistor and by-pass condenser connecting said potentiometer means to said relay means, whereby a transient anticipation voltage is applied to said relay means for preventing oscillation of said control system.

9. In an aircraft flight control system, the combination of a servomotor, electric relay control means for said servomotor, the said servomotor being sufficiently fast acting to form an oscillatory system with said relay control means when connected thereto with a follow-up system, potentiometer follow-up means operated by said servomotor for obtaining a voltage corresponding to the extent of servomotor movement and applying the said voltage to said relay control means, and a resistor and by-pass condenser connecting said potentiometer means to said relay control means, whereby a transient anticipation voltage corresponding to rate of movement of said servomotor is applied to said relay control means for preventing oscillation of the control system.

10. In an aircraft flight control system the combination comprising a servomotor, electric control means for said servomotor, a source of voltage, means actuated by said servomotor for controlling the value of voltage from said source to be applied to said control means, and means interconnecting said electric control means with said voltage control means including a direct current voltage path and a transient voltage path whereby in response to the rate of movement of said servomotor a transient anticipation voltage is applied to said electric control means for preventing oscillation of said control system.

11. In an altitude control system for aircraft having an altimeter for producing a signal voltage indicating altitude of the craft and automatic pilot means for regulating aircraft attitude, the combination comprising an attitude servomotor, a source of voltage for obtaining a control voltage corresponding to a predetermined set altitude, voltage controlled relay means responsive to said control voltage and to the signal voltage produced by said altimeter for operating said servomotor to adjust aircraft attitude in accordance with the altitude deviation, means for deriving a variable voltage corresponding to the extent of servomotor movement for application to said relay means, means for controlling said variable voltage thereby to regulate the extent of movement of said servomotor which corresponds to a given altitude deviation, and a plurality of paths interposed between said relay means and said means for deriving a variable voltage, one of said paths having a low impedance characteristic for a changing voltage and a high impedance for a constant voltage whereby a transient anticipation voltage is applied to said relay means for preventing oscillation of said control system.

12. The method of controlling an aircraft provided with an automatic attitude control system including a pitch gyroscope associated with a follow-up system comprising the steps of unbalancing the follow-up system as a function of the deviation of the craft from a selected altitude and changing the unbalance in an opposite direction in response to the approach of the craft to said selected altitude so that the unbalance becomes zero as the craft reaches said altitude.

13. The method of controlling an aircraft provided with an automatic attitude control system including a pitch gyroscope associated with the follow-up system comprising the steps of unbalancing the follow-up system as a function of the deviation of said craft from a selected altitude and changing said unbalance in the opposite direction in response to the approach of the craft to the selected altitude whereby the craft approaches the attitude of level flight as said craft reaches said selected altitude.

14. The method of controlling an aircraft to fly at a selected altitude comprising the steps of varying the longitudinal attitude of said craft from its level flight position as a function of the deviation from said selected altitude, and automatically varying said attitude in the opposite sense in response to the approach of the craft to said selected altitude so that said craft reaches said altitude in substantially the attitude of level flight.

15. A system for controlling an aircraft including means for predetermining a selected flight altitude, means responsive to a deviation from said altitude for changing the attitude of the aircraft in accordance with the direction of the deviation, and means for governing the attitude change in proportion to the magnitude of deviation.

16. A system for controlling an aircraft at a selected altitude including means for deriving in response to altitude a uni-directional voltage related in magnitude to the altitude of the aircraft, an auxiliary source of uni-directional voltage, manually operable selector means connected to said source to derive therefrom two voltages corresponding in their magnitudes to altitudes respectively above and below a selected altitude, voltage divider means connected to said selector means and provided with a movable contact whereby the voltage of said contact is of a value intermediate said two voltages, relay means differentially responsive to said voltage of intermediate value and said first mentioned uni-directional voltage, and a servomotor controlled by said relay means and connected to said movable contact for controlling the adjustment of the altitude of the aircraft.

17. An altitude control system for aircraft comprising means for developing a uni-directional voltage having a magnitude proportional to the altitude of said aircraft, a source of voltage for obtaining a control voltage corresponding in magnitude to a selected set range of altitude, means for comparing said voltages, means responsive to a predetermined amount of differential of said compared voltages for adjusting the aircraft attitude in accordance with the altitude deviation.

18. An altitude control system for aircraft comprising means for developing a unidirectional voltage having a magnitude proportional to the altitude of said aircraft, a source of voltage for obtaining a control voltage corresponding in magnitude to a selected set altitude, means for comparing said voltages, means responsive to a predetermined differential of said compared voltages for adjusting the attitude of the aircraft in proportion to the magnitude of altitude deviation.

19. An altitude control system for aircraft comprising means for developing a uni-directional voltage having a magnitude proportional to the altitude of said aircraft, a source of voltage for obtaining a control voltage corresponding in magnitude to a selected set altitude, an electric relay control means responsive to said voltages, a servomotor controlled by said control means, means responsive to said servomotor for adjusting the attitude of the aircraft, and means actuated by said servomotor for applying to said control means a voltage proportional to the extent of movement of said servomotor.

20. An altitude control system for aircraft comprising means for developing a uni-directional voltage having a magnitude proportional to the altitude of said aircraft, a source of voltage for obtaining a control voltage corresponding in magnitude to a selected set altitude, an electric relay control means responsive to said voltages, a servomotor controlled by said control means, means responsive to said servomotor for adjusting the attitude of the aircraft, means actuated by said servomotor for applying to said control means a voltage proportional to the extent of movement of said servomotor, and means for varying the proportion of said last mentioned voltage.

WILLIAM C. COULBOURN.

REFERENCES CITED

The following references are of record in the file of this patent:

UNITED STATES PATENTS

| Number | Name | Date |
|---|---|---|
| 2,176,807 | Wunsch | Oct. 17, 1939 |
| 2,176,817 | Jacobson et al. | Oct. 17, 1939 |
| 2,350,024 | Francis | May 30, 1944 |
| 2,356,339 | Morrison | Aug. 22, 1944 |